(12) United States Patent
MacDonald (10) Patent No.: US 10,925,273 B2
(45) Date of Patent: Feb. 23, 2021

(54) EQUINE HOOF BOOT

(71) Applicant: SCOOTBOOT PTY LTD, Koonya (AU)

(72) Inventor: David Duncan MacDonald, Koonya (AU)

(73) Assignee: SCOOTBOOT PTY LTD, Koonya (AU)

( * ) Notice: Subject to any disclaimer, the term of this patent is extended or adjusted under 35 U.S.C. 154(b) by 241 days.

(21) Appl. No.: 14/777,201

(22) PCT Filed: Mar. 13, 2014

(86) PCT No.: PCT/AU2014/000249
§ 371 (c)(1),
(2) Date: Sep. 15, 2015

(87) PCT Pub. No.: WO2014/138790
PCT Pub. Date: Sep. 18, 2014

(65) Prior Publication Data
US 2016/0029609 A1    Feb. 4, 2016

(30) Foreign Application Priority Data
Mar. 15, 2015    (AU) ................................ 2013900903

(51) Int. Cl.
*A01L 3/00*    (2006.01)
*A01K 13/00*    (2006.01)

(52) U.S. Cl.
CPC .............. *A01L 3/00* (2013.01); *A01K 13/007* (2013.01)

(58) Field of Classification Search
CPC ...... A01L 3/00; A01L 3/02; A01L 3/06; A01L 5/00; A01K 13/007; A43B 23/028; A43B 23/04; A43B 23/042; A43B 23/045; A43B 23/047; A43B 11/00
See application file for complete search history.

(56) References Cited

U.S. PATENT DOCUMENTS

| | | | |
|---|---|---|---|
| 65,231 A * | 5/1867 | Jennings | A01K 13/007 168/2 |
| 70,035 A * | 10/1867 | Sloat | A01L 3/00 168/18 |
| 96,104 A † | 10/1869 | Haedrich | |
| 124,215 A * | 3/1872 | Moran et al. | A01L 3/00 168/18 |

(Continued)

FOREIGN PATENT DOCUMENTS

| | | |
|---|---|---|
| AU | 2013200509 A1 | 2/2013 |
| AU | 2014231767 A1 | 9/2014 |

(Continued)

OTHER PUBLICATIONS

International Search Report dated Apr. 11, 2014 for corresponding International Patent Application PCT/AU2013/000249, filed Mar. 13, 2014.

(Continued)

*Primary Examiner* — Kathleen I Alker (74) *Attorney, Agent, or Firm* — David D. Brush; Westman, Champlin & Koehler, P.A.

(57) ABSTRACT

A secure equine hoof boot is provided, which engages the bulbs of the hoof to impede rotation of the boot relative to the hoof.

5 Claims, 10 Drawing Sheets

(56) References Cited

U.S. PATENT DOCUMENTS

| | | | |
|---|---|---|---|
| 149,930 A * | 4/1874 | Higgins | A01K 13/007 54/82 |
| 167,895 A * | 9/1875 | Hall | A01K 13/007 168/2 |
| 177,991 A * | 5/1876 | Cook | A01K 13/007 54/82 |
| 267,855 A * | 11/1882 | Fenley | A01L 3/00 168/18 |
| 288,836 A † | 11/1883 | Miller | |
| 349,668 A * | 9/1886 | St. John | A01K 13/007 168/2 |
| 440,048 A * | 11/1890 | Mayow et al. | A01L 3/00 168/22 |
| 448,312 A * | 3/1891 | Barclay | A01L 3/00 168/18 |
| D26,832 S * | 3/1897 | Hirsch | 168/1 |
| 601,541 A * | 3/1898 | Anderson | A01L 5/00 168/4 |
| 617,153 A * | 1/1899 | Galpin | A01K 13/007 168/2 |
| 625,810 A * | 5/1899 | Shappell | A01K 13/007 168/2 |
| 630,310 A * | 8/1899 | Agnew | A01K 13/007 168/2 |
| 661,424 A * | 11/1900 | Pflueger | A01L 3/00 168/18 |
| 697,791 A * | 4/1902 | Boumal | A01L 3/00 168/18 |
| 708,983 A * | 9/1902 | Bartlett | A01L 7/04 168/1 |
| 719,687 A * | 2/1903 | Nickerson | A01K 13/007 168/2 |
| 759,636 A * | 5/1904 | Ryan | A01L 7/02 168/18 |
| 797,895 A * | 8/1905 | Johnson | A01L 3/00 168/18 |
| 798,598 A * | 9/1905 | Conn | A01L 3/00 168/18 |
| 840,892 A | 1/1907 | Emile | |
| 918,556 A * | 4/1909 | Kalm | A01L 3/00 168/22 |
| 1,036,750 A * | 8/1912 | Tuttle | A01K 13/007 54/82 |
| 1,039,002 A * | 9/1912 | Winston | A01L 3/00 168/1 |
| 1,054,563 A * | 2/1913 | Kiso | A01L 7/04 168/1 |
| 1,096,912 A | 5/1914 | Herman | |
| 1,129,683 A * | 2/1915 | Jaffie | A01L 3/00 168/22 |
| 1,211,268 A * | 1/1917 | Zadina | A01L 3/04 168/19 |
| 1,218,901 A * | 3/1917 | Saxton | A01L 3/00 168/18 |
| 1,270,207 A | 6/1918 | Preston | |
| 1,274,483 A * | 8/1918 | Wiesenberg | A01L 3/00 168/18 |
| 1,294,896 A * | 2/1919 | Grant | A01L 3/00 168/18 |
| 1,298,364 A * | 3/1919 | McCoy | A01L 3/00 168/1 |
| 1,328,708 A * | 1/1920 | Blondeau | A01L 3/00 168/18 |
| 1,879,991 A | 9/1932 | Pratt | |
| 2,064,566 A * | 12/1936 | Richman | A01K 13/007 36/111 |
| 2,535,394 A * | 12/1950 | Davis | A01K 13/007 36/111 |
| 2,572,889 A | 10/1951 | Strykower | |
| 2,619,744 A * | 12/1952 | Mattes | A43B 3/30 36/105 |
| 3,364,500 A | 1/1968 | Fox | |
| 3,439,670 A * | 4/1969 | Schuerch | A01K 13/007 602/26 |
| 3,794,119 A | 2/1974 | Paiso et al. | |
| 3,867,905 A | 2/1975 | Vail, Jr. | |
| 3,967,683 A * | 7/1976 | Ensinozo | A01L 3/00 168/19 |
| 4,019,463 A | 4/1977 | Kitchen | |
| 4,185,695 A | 1/1980 | Hancock | |
| 4,189,004 A * | 2/1980 | Glass | A01L 3/02 168/18 |
| 4,212,356 A * | 7/1980 | Battle | A01L 3/02 168/18 |
| 4,265,314 A | 5/1981 | Tovim | |
| 4,346,762 A * | 8/1982 | Tovim | A01L 3/02 168/17 |
| D293,043 S | 12/1987 | Zamboni | |
| 4,736,800 A * | 4/1988 | Rohner | A01L 5/00 168/18 |
| D295,907 S * | 5/1988 | Decker | D30/143 |
| 4,744,422 A * | 5/1988 | Dallmer | A01L 3/00 168/18 |
| 4,981,010 A * | 1/1991 | Orza | A01K 13/007 168/18 |
| 5,148,872 A * | 9/1992 | Dallmer | A01K 13/007 168/11 |
| D343,291 S | 1/1994 | Langford | |
| 5,282,825 A | 2/1994 | Muck et al. | |
| 5,345,656 A | 9/1994 | Merritt | |
| D354,760 S | 1/1995 | Wolff | |
| 5,481,888 A | 1/1996 | Perry | |
| 5,511,756 A | 4/1996 | Spradling | |
| 5,528,885 A * | 6/1996 | Chamberlain | A01K 13/007 54/82 |
| 5,600,901 A * | 2/1997 | Leonor | A43B 5/18 36/105 |
| D382,503 S | 8/1997 | Kalbach | |
| D410,336 S | 6/1999 | Frisoni | |
| 6,056,173 A | 5/2000 | Gillespie | |
| 6,058,578 A | 5/2000 | Lan | |
| 6,192,989 B1 * | 2/2001 | Tooman | A01K 13/007 168/1 |
| 6,619,238 B1 | 9/2003 | Amato | |
| 6,694,713 B1 * | 2/2004 | MacDonald | A01K 13/007 168/18 |
| D505,259 S | 5/2005 | Heatherwick | |
| 7,032,367 B1 | 4/2006 | Yoho | |
| D543,697 S | 6/2007 | Heatherwick | |
| D557,008 S | 12/2007 | Stiller | |
| 7,302,788 B1 * | 12/2007 | Chang | A01K 13/007 168/18 |
| D568,148 S | 5/2008 | Tamura et al. | |
| 7,445,051 B2 | 11/2008 | Ruetenik | |
| D597,824 S | 8/2009 | Wang | |
| 7,578,115 B2 | 8/2009 | Ford et al. | |
| D614,018 S | 4/2010 | McClanahan et al. | |
| D615,253 S | 5/2010 | Goodell | |
| D629,290 S | 12/2010 | Stevens et al. | |
| D638,330 S | 5/2011 | Fahrendorff et al. | |
| 8,151,545 B1 * | 4/2012 | Ford | A01K 13/007 54/82 |
| D662,436 S | 6/2012 | Kalbach | |
| 8,245,418 B2 * | 8/2012 | Paintin | A43B 1/0054 36/138 |
| D667,749 S | 9/2012 | Case et al. | |
| D677,842 S | 3/2013 | Kalbach | |
| D679,218 S | 4/2013 | Kalbach | |
| 8,413,412 B2 * | 4/2013 | Ford | A01K 13/007 168/18 |
| D695,976 S | 12/2013 | Allen, Jr. | |
| D699,144 S | 2/2014 | Kalbach | |
| D711,602 S | 8/2014 | Driver | |
| 8,931,244 B2 * | 1/2015 | Gola | A01K 13/007 168/18 |
| D743,691 S | 11/2015 | Romano | |
| D765,413 S | 9/2016 | Derr | |
| D770,170 S | 11/2016 | Akana et al. | |
| 9,538,738 B2 * | 1/2017 | Bergeleen | A01L 3/00 |
| 9,704,368 B2 | 7/2017 | Dehart | |

(56) References Cited

U.S. PATENT DOCUMENTS

| | | | |
|---|---|---|---|
| D793,075 S | 8/2017 | Ma et al. | |
| D796,124 S | 8/2017 | Ying | |
| D851,920 S | 6/2019 | Mouriz | |
| 10,306,972 B2 | 6/2019 | Mendez et al. | |
| 10,330,173 B1 | 6/2019 | McKye et al. | |
| D854,916 S | 7/2019 | Derr | |
| D880,148 S | 4/2020 | Akana et al. | |
| 2007/0084020 A1 | 4/2007 | Chui et al. | |
| 2007/0121987 A1 | 5/2007 | Fielding, Jr. | |
| 2008/0264005 A1 | 10/2008 | Ford | |
| 2009/0120980 A1 | 5/2009 | Calayo | |
| 2013/0008139 A1 | 1/2013 | Lander | |
| 2013/0014960 A1 | 1/2013 | Palmer et al. | |
| 2013/0019575 A1 | 1/2013 | Bartlett | |
| 2013/0105180 A1 | 5/2013 | Valer Fuentes | |
| 2013/0112437 A1 | 5/2013 | Sledd et al. | |
| 2014/0166006 A1 | 6/2014 | Meier | |
| 2014/0231100 A1 | 8/2014 | Ford | |
| 2014/0251642 A1* | 9/2014 | Revheim | A01L 3/02 168/18 |
| 2014/0331944 A1 | 11/2014 | Chirico | |
| 2014/0367124 A1 | 12/2014 | Moller et al. | |
| 2014/0374124 A1 | 12/2014 | Mahidhara | |
| 2015/0060089 A1 | 3/2015 | Kunkle | |
| 2015/0152942 A1 | 6/2015 | Kindstrand et al. | |
| 2015/0238344 A1* | 8/2015 | Nylund | A01L 3/00 602/12 |
| 2015/0366181 A1 | 12/2015 | Koenig et al. | |
| 2016/0324136 A1* | 11/2016 | Silanus | A01K 13/007 |

FOREIGN PATENT DOCUMENTS

| | | | |
|---|---|---|---|
| BR | 8307232 A | | 8/1985 |
| BR | 8307232 B2 † | | 8/1985 |
| CA | 2824535 A1 | | 7/2012 |
| CN | 102811609 A | | 12/2012 |
| CN | 103385228 A | | 11/2013 |
| CN | 204206956 U | | 3/2015 |
| CN | 204206957 U | | 3/2015 |
| DE | 155659 C | | 7/1902 |
| EP | 2409565 A1 | | 1/2012 |
| ES | 1072993 U | | 10/2010 |
| GB | 2128867 A | | 5/1984 |
| GB | 2338394 A | | 12/1999 |
| GB | 2492266 B | | 5/2014 |
| GB | 2517176 A | | 2/2015 |
| IE | S86373 B2 | | 4/2014 |
| IN | 2317DEN2015 A | | 8/2015 |
| WO | 2008025065 A1 | | 3/2008 |
| WO | 2014046634 A1 | | 3/2014 |
| WO | 2014166006 A1 | | 10/2014 |
| WO | 2014176705 A1 | | 11/2014 |
| WO | 2015026253 A1 | | 2/2015 |
| WO | 2015069307 A1 | | 5/2015 |
| WO | 2015157817 A1 | | 10/2015 |
| WO | 2015186036 A1 | | 10/2015 |
| WO | 2015172211 A1 | | 11/2015 |

OTHER PUBLICATIONS

Written Opinion of the International Searching Authority dated Sep. 15, 2015 for corresponding International Patent Application PCT/AU2013/000249, filed Mar. 13, 2014.
Partial European Search Report dated Oct. 13, 2016 for corresponding European Application No. 14765745.
Espacenet search results on Apr. 20, 2016 10:55—Shoe of hoof or hooves or feet or hose or equine or retain or secure or lock or bulb in teh title or abstract.
Notice of Allowance dated Jul. 22, 2020 for corresponding U.S. Appl. No. 29/677,621, filed Jan. 22, 2019.

\* cited by examiner
† cited by third party

EQUINE HOOF BOOT

The present application is a Section 371 National Stage Application of International Application No. PCT/AU2014/000249, filed Mar. 13, 2014, which is incorporated by reference in its entirety and published as WO 2014/138790 A1 on Sep. 18, 2014, in English.

FIELD OF INVENTION

The present invention relates to the field of equine hoof protection, particularly horse hoof protection.

BACKGROUND

There has been a long history of use of metal shoes to protect hooves of horses and other pack animals in the horse family. For thousands of years horses have been shod with metal horse shoes as a means of protecting the horse's hooves from abrasive surfaces. The metal horse shoe protects the outer periphery of the hoof wall and is attached to the hoof by nailing. Such shoes however are known to cause problems.

The main problem that arises with metal shoes is that they have to be replaced every six to eight weeks and this is expensive and time consuming. Aside from a regular replacement schedule, shoes need replacing because horses lose their shoes unexpectedly. In such an event the horse cannot be ridden until the missing shoe is replaced. It is also known in the industry that nailing metal shoes to the horse's hoof damages the hoof wall and increases concussion to the horse's hoof capsule and skeletal frame. In addition, restriction of normal movement of the hoof can lead to undesirable changes in the hoof and in some cases promote disease.

Hoof boots were first developed in the early 1970s partly in response to concern about the health of animals' hooves. The fact that hoof boots are intended only to be worn intermittently (when the horse is being ridden or trained) lessens the potential damage done by confining the hoof. Aside from protecting the hoof during riding, hoof boots were also developed for therapeutic reasons such as to protect a damaged hoof while it healed or to rehydrate hooves.

There are numerous patents and patent applications relating to horse hoof shoes and boots. Early examples of these include Adam (U.S. Pat. Nos. 840,892) which discloses a horse shoe secured with straps which wrap around the hoof with a rear upwardly extending tongue and Herman (U.S. Pat. No. 1,096,912) which discloses a shoe with a heel stay also secured by a strap. A later example, Paiso (U.S. Pat. No. 3,794,119) describes a horse shoe with a contoured pocket and tongue which fit the rear of the hoof and is attached by a strap which completely encloses the hoof.

U.S. Pat. No. 7,032,367 in the name of Yoho discloses a hoof boot comprising a sole portion, a bell portion to fit over the front of the hoof and retaining straps.

U.S. Pat. No. 7,445,051 in the name Ruetenik relates to a boot assembly which has a shock absorbing pad for use inside a boot. The assembly may be used during normal riding or during treatment of a hoof problem.

U.S. Pat. No. 7,578,115 in the name of Easycare Inc discloses a slip-on horse boot with a replaceable pastern gaiter. This provides an anchor for the rear portion of the boot as a way of helping the boot stay in place.

US patent application No. 2013/0008139 in the name of Lander discloses a hoof boot which has a cage like heel captivator pivoted to the base.

US patent application No. 2013/0014960 in the name of Palmer and Palmer discloses a removable equine shoe for use in icy conditions which has a bulb loop attached to a pastern strap as a means of retaining the shoe.

US patent application No. 2013/0019575 in the name of Bartlett discloses a therapeutic horse boot with a raised sole platform and a central opening through which air can circulate.

A number of different horse boots are also on the market. These include Easyboot Bare, the Boa® Horse Boot and the Old Mac's G2.

While the horse boots currently on the market provide different fittings for keeping the boot on the hoof there is still room for improvement. Specifically there is still a need for a secure fitting light weight boot for use in the riding, training or working of horses and related animals.

The above references to and descriptions of prior proposals or products are not intended to be, and are not to be construed as, statements or admissions of common general knowledge in the art.

SUMMARY

In a first aspect the invention provides an equine hoof boot comprising: a) a sole member suitable for engaging the ground and protecting a hoof from wear; b) a retaining means of suitable size, shape and strength for securing the boot to the hoof said retaining means having an inside contactable with a hoof, an outside, a ventral portion located at its front and a dorsal portion located at its rear; and c) a bulb engaging means for positively engaging the peripheries of the bulbs of the hoof, wherein said retaining means and engaging means impede rotation of the boot relative to the hoof.

The term "equine" refers to a member of the horse family and includes horses, mules, donkeys and the like.

The term "hoof boot" refers to a device to safeguard the hoof from damage such as a boot, or a more open structure akin to a sandal or the like.

The term "a sole member suitable for engaging the ground" refers to a member which is suitably durable and, in use, engages with the ground similar to the sole of a shoe. The term does not refer to the anatomical region of the hoof known as the "sole".

The term "protecting the hoof" refers any means suitable for shielding or otherwise protecting the hoof, particularly the periphery of the hoof from damage. The periphery of the hoof corresponds to that part of the wall of the hoof which is in contact with the ground.

The term "retaining means" refers to any means suitable for securing the boot to the hoof or otherwise allowing the animal to wear the boot on its hoof.

The term "suitable size, shape and strength for securing the boot to the hoof" refers to the boot being of an appropriate size, shape and strength of material to provide an adequate boot.

The term "ventral portion" refers to that part of the boot that corresponds to the front or toe region of the hoof.

The term "dorsal portion" refers to that part of the boot that corresponds to the back or heel region of the hoof.

The term "a bulb engaging means for positively engaging the peripheries of the bulbs of the hoof" refers to a means which contacts and (when the boot is fitted appropriately) exerts pressure on the peripheries of the bulbs of the hoof akin to an interference fit. This is a type of form fit where the retaining means pushes the bulb engaging means into or onto the edges of the bulbs (as distinct from cupping of the bulbs) to allow settling of the hoof into the boot. The bulb engaging means cooperate with the other elements of the boot to limit lateral rotation of the boot. The term "peripheries of the bulbs" refers to the edges of the bulbs and includes the cleft of the bulbs.

The cleft of the bulb refers to the anatomical feature which corresponds to a groove or depression located between the bulbs on the hoof. Although strictly speaking this is not as anatomically distinct as the cleft of the frog it still constitutes a recess or niche in the anatomy of the heel of the hoof. The present invention utilizes this recess or niche as a primary anchor point.

Preferably the bulb engaging means is fixed in relation to the sole member.

Preferably the retaining means comprises a shell of substantially non-deformable material.

Preferably said dorsal portion is open, substantially open or deformable so that when fitted, the bulbs of the hoof are free protrude to outside the shell and said bulb engaging means operate such that ventral and/or dorsal movement of the hoof in the boot is impeded.

The term "open or substantially open" refers to an aperture or vent in the retaining means which may have an additional elements.

The term "the bulbs of the hoof protrude to the outside" refers to the bulbs passing through the retaining means when the boot is fitted.

The term "ventral and/or dorsal movement" refers to movement from front to back or back to front in the boot.

The term "impeded" refers to hampering, inhibiting or hindering back and forth movement of the hoof.

Preferably part of the bulb engaging means is of a shape which is anatomically compatible with the cleft of the bulbs. More preferably the bulb engaging means includes a shank or web. More preferably the shank is adjacent arches which straddle the tops of the bulbs. Preferably the shank or web is half round in cross section.

Preferably the boot comprises a sole member with an interior surface on which, in use, the hoof sits and an opening suitable for fitting the boot to a hoof which in an open condition extends unobstructed from said interior surface through the retaining means. Even more preferably the opening is located at the front of the boot.

In another aspect invention provides an equine hoof boot comprising: a) a sole member suitable for engaging the ground and protecting a hoof from wear; and b) a suitably sized and shaped retaining means for securing the boot to the hoof said means having an inside contactable with a hoof, an outside, a ventral portion located at its front and a dorsal portion located at its rear, wherein said dorsal portion is open or substantially open so that when fitted, the bulbs of the hoof protrude to the outside such that ventral and/or dorsal movement of the hoof in the boot is impeded.

In another aspect the invention provides an equine hoof boot comprising: a) a sole member suitable for engaging the ground and protecting a hoof from wear; b) a retaining means for securing the boot to the hoof; and c) a cleft engaging means for positively engaging the cleft of the bulbs of the hoof, wherein said retaining means and engaging means impede rotation of the boot relative to the hoof.

The term "a cleft engaging means" refers to a means which contacts, meshes or interlocks with the cleft of the bulb.

The term "positively engaging the cleft of the bulbs of the hoof" refers to the means occupying the cleft or protruding into the cleft.

The term "impede rotation of the boot in relation to the hoof" refers to to hampering, inhibiting or hindering axial or lateral rotation of the boot in relation to the animal's leg and hoof.

In another aspect the invention provides an improved equine hoof boot which has an open condition and a closed condition said boot comprising a ground engagable sole member with an inside surface suitable for seating the hoof, an upper member for retaining the boot on the hoof when in the closed condition and an opening in the upper member, the improvement comprising that in the open condition, the opening extends unobstructed from the upper member to the level of the inside surface thus providing convenient fitting of the boot.

In yet another aspect the invention relates to a method of manufacturing a hoof boot comprising: a) a sole member suitable for engaging the ground and protecting a hoof from wear; b) a retaining means of suitable size, shape and strength for securing the boot to the hoof said retaining means having an inside contactable with a hoof, an outside, a ventral portion located at its front and a dorsal portion located at its rear; and c) a bulb engaging means for positively engaging the peripheries bulbs of the hoof, wherein said retaining means and engaging means impede rotation of the boot relative to the hoof; said method comprising providing suitable material and assembling, moulding or otherwise forming the material into the boot. The invention also relates to manufacture of hoof boots according to the other aspects of the invention.

The invention is partially predicated on the inventor's surprising realization that the anatomy of the hoof itself, specifically the cleft of the bulbs could be used as an anchor point to prevent a horse boot from rotating on the hoof.

DETAILED DESCRIPTION OF ILLUSTRATIVE EMBODIMENTS OF THE INVENTION

The invention will now be described with reference to the following non limiting illustrative drawings.

Figure 1:
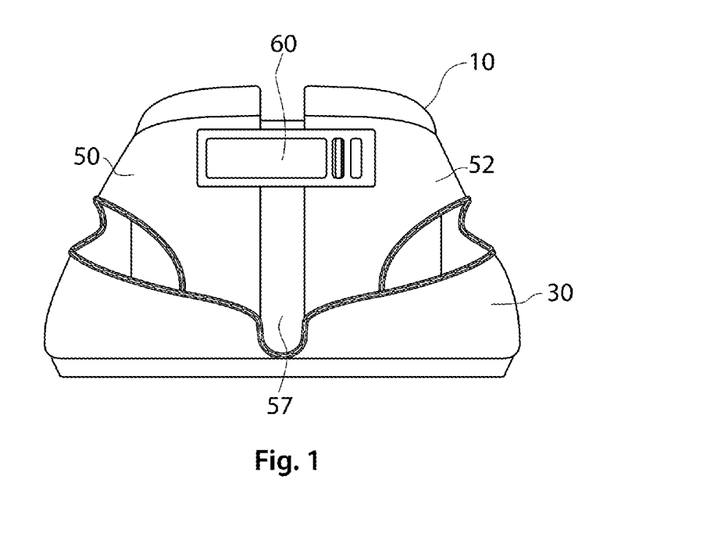
FIG. 1 is a front view of a first embodiment the boot.
Figure 4:
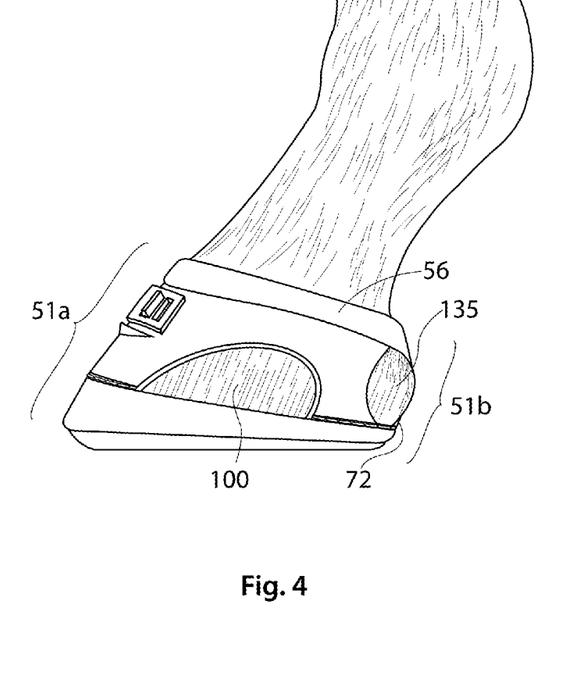
FIG. 4 is a side view of a first embodiment boot in a closed condition fitted to a hoof.

As seen in FIGS. 1 and 4, a first embodiment of the boot 10 comprises ground engaging sole member 30, retaining means 50 comprising boot upper 52 and strap 60, with ventral portion 51*a* located towards the front of boot and dorsal portion 51*b* located at the rear. The open character of boot 10 helps to provide a light weight boot.

Figure 2:
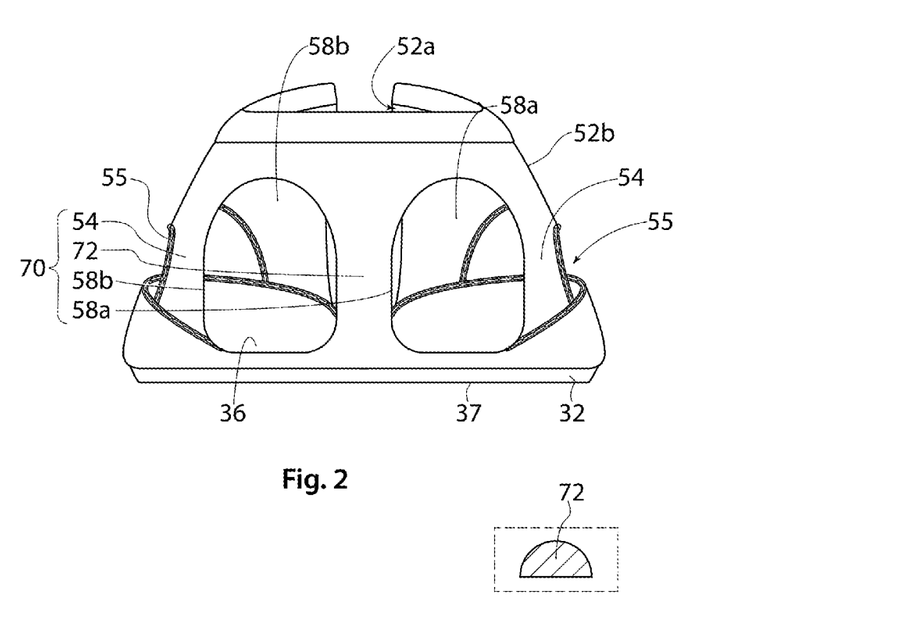
FIG. 2 is a rear view of a first embodiment boot with an additional view of the shank in cross section.

Sole member 30 which forms the bottom of the boot comprises sole plate 32 with interior surface 36 and external surface 37 (FIG. 2). Interior surface 36 is suitable for seating the ground bearing portion or rim of hoof 100. Exterior surface 37 has a suitable tread. Sole member 30 may be constructed of various materials but the preferred material is TPU (thermoplastic polyurethane) which is a very hard wearing material suitable for the abrasive nature of a moving horse on its foot wear. TPU utilized may be of appropriate rigidity such as 95 Shore A hardness or 60 or 65 Shore D hardness. Boot upper 52 may be made of stiff leather or other suitable material and joined to sole member 30 by means of stitching.

Figure 3:
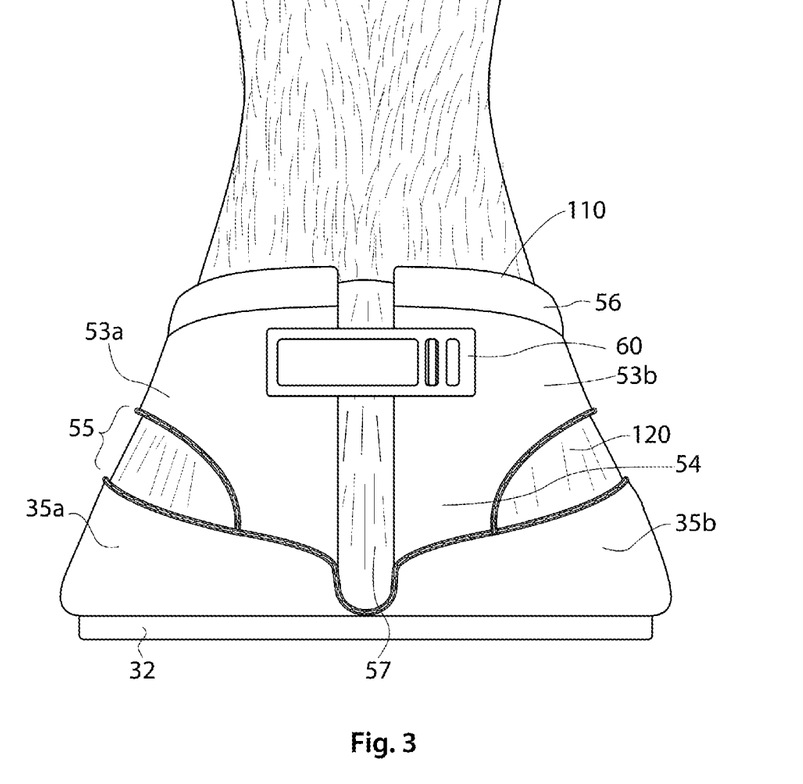
FIG. 3 is a front view of the a first embodiment boot in a closed condition fitted to a hoof

Upwardly depending sidewalls 35a and 35b of sole member 30 are sloped to mimic the angle of hoof wall 120 (FIG. 3). Although these are shown as continuous walls of constant cross section in the drawings it is envisaged that sidewalls 35a and 35b may be pleated, fringed or fluted to accommodate the different hoof wall anatomy of individual horses (some horses have very steep hoof walls while other has very sloped walls). Notably sidewalls 35a and 35b do not extend all the way around to heel 130 of hoof 100 providing a substantially open rear of boot 100 (FIG. 4).

Retaining means 50 comprises boot upper 52 with inside 52a and outside 52b. Boot upper 52 includes webs 53a and 53b which extend from the tops of sidewalls 35a and 35b up to collar 56. Webs 53 comprise two pairs of legs 54 (one pair at the front and one pair at the back) which define side vents 55. Side vents 55 provide air circulation and a means of escape for debris collected by the boot. Front opening 57 adjacent webs 53a and 53b extends from collar 56 at the top of boot 10 all the way to the level of interior surface 36 in sole plate 32.

Bulb engaging means 70 comprises shank 72, rear legs of pair 54 and apertures 58a and 58b at the back of boot 10. Shank 72 is advantageously half round in cross section as shown in FIG. 2. Shank 72 runs from sole plate 32 to collar 56. Bulb engaging means 70 is fixed in relation to sole member 30 and unlike the Lander boot of the prior art does not pivot.

When fitted, boot 10 snugly conforms to horse hoof 100. Collar 56 fits just on or above coronary band 110 of the hoof which is the area of the hoof where the hair on the horse's leg meets the smooth solid hoof wall 120. Boot 10 is in an open condition when strap 60 is unfastened. Front opening 57 allows boot 10 in the open condition to be opened up entirely to allow easy application of hoof 100 into the boot. Front opening 57 may be from 2 to 50 mm in width, preferably from 30 to 50 mm in width.

A tension snap lock comprising strap 60 and grips is used to secure the front two sides of the upper portion of boot 10 bring about the closed condition. Once hoof 100 is placed into boot 10 then the snap lock pulls the two front edges (webs 53a and 53b) of upper portion 52 together securing the front of the boot and ensuring the hoof is securely contained inside the boot. A tension snap lock is the preferred means for the securing and closure system but other forms of closure can be used such as buckles and the like.

Boot 210 (shown in FIGS. 5 to 9) is shallower in depth and simpler in construction than the first embodiment. Thermoplastic urethane (TPU), a durable, relatively rigid or non-deformable material is injection moulded to form sole member 230 and shell 252 as a unitary piece. The TPU used has an appropriate hardness value such as 95 Shore A hardness, 60 or 65 Shore D hardness or other suitable hardness. In this embodiment retaining means 250 comprises shell 252, front straps 260 and security strap 280. Straps 260 and strap 280 are also made of TPU. Strap 280 wraps around the upper pastern of the horse and provides an extra tether.

Figure 9:
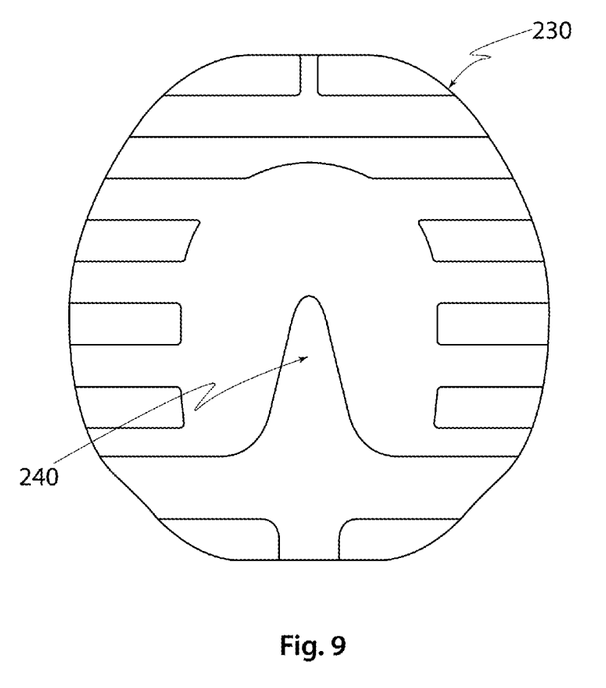
FIG. 9 is a bottom view of the second embodiment of the boot.

Sole member 230 comprises interior surface 236 and exterior surface 237 (FIG. 7c) with frog support 240 and has an appropriate tread in the area that corresponds to the wall of the hoof (FIG. 9). Viewed from below sole plate 230 is a distorted 'O' shape with a broader dorsal region and an opposite blunted ventral end mimicking the basic shape of the sole of a hoof.

Shell 252 has ventral portion 251a and dorsal portion 251b and comprises side walls 253 and bulb engaging means 270 which extend upwardly from sole member 230.

Sidewalls 253 extend from front flaps 253a and 253b around to rear legs 254 with side vents 255.

Figure 5:
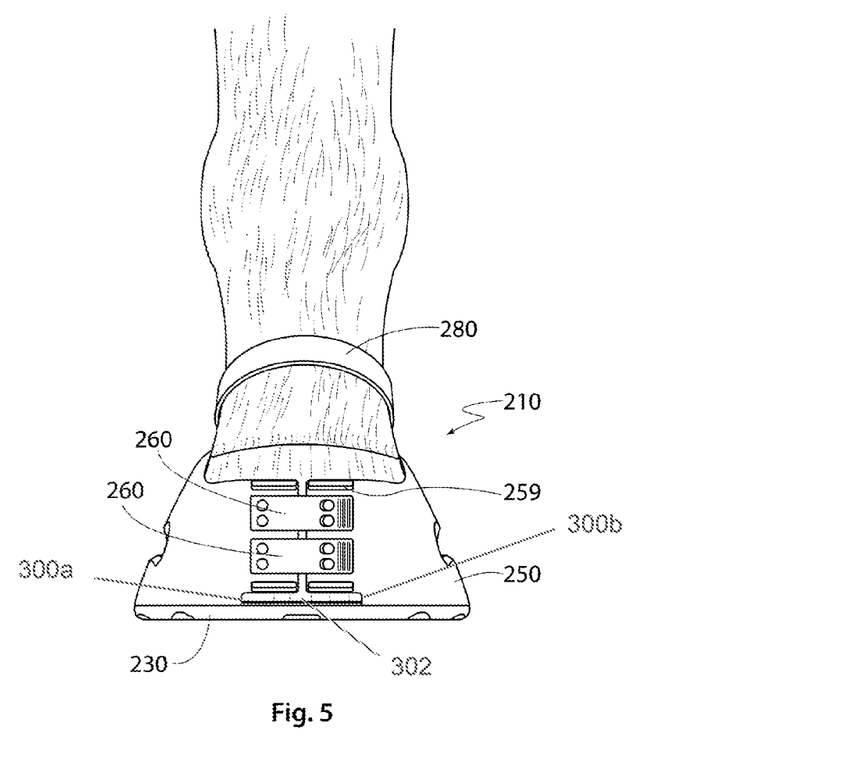
FIG. 5 is a front view a second embodiment of the boot in a closed condition fitted to a hoof.
Figure 6:
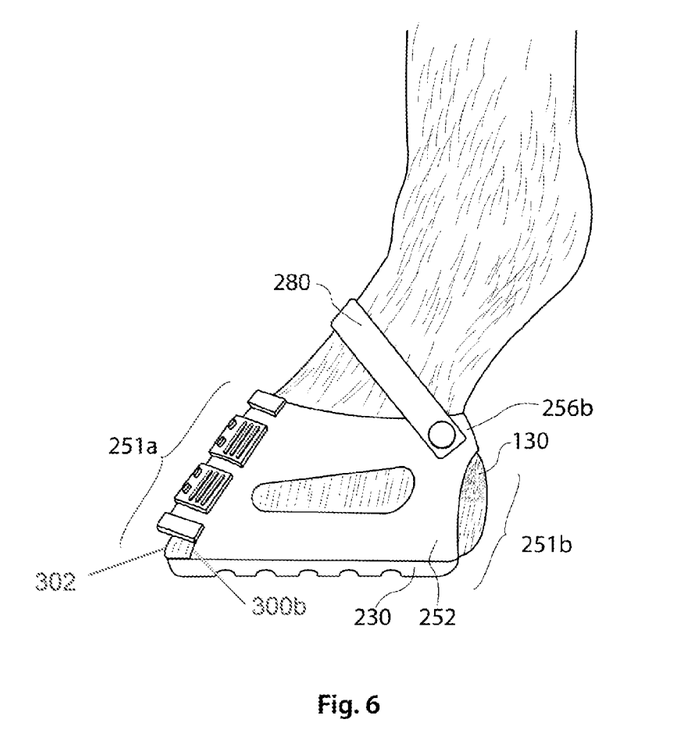
FIG. 6 is a side view of a second embodiment of the boot in a closed condition fitted to a hoof.
Figure 7A:
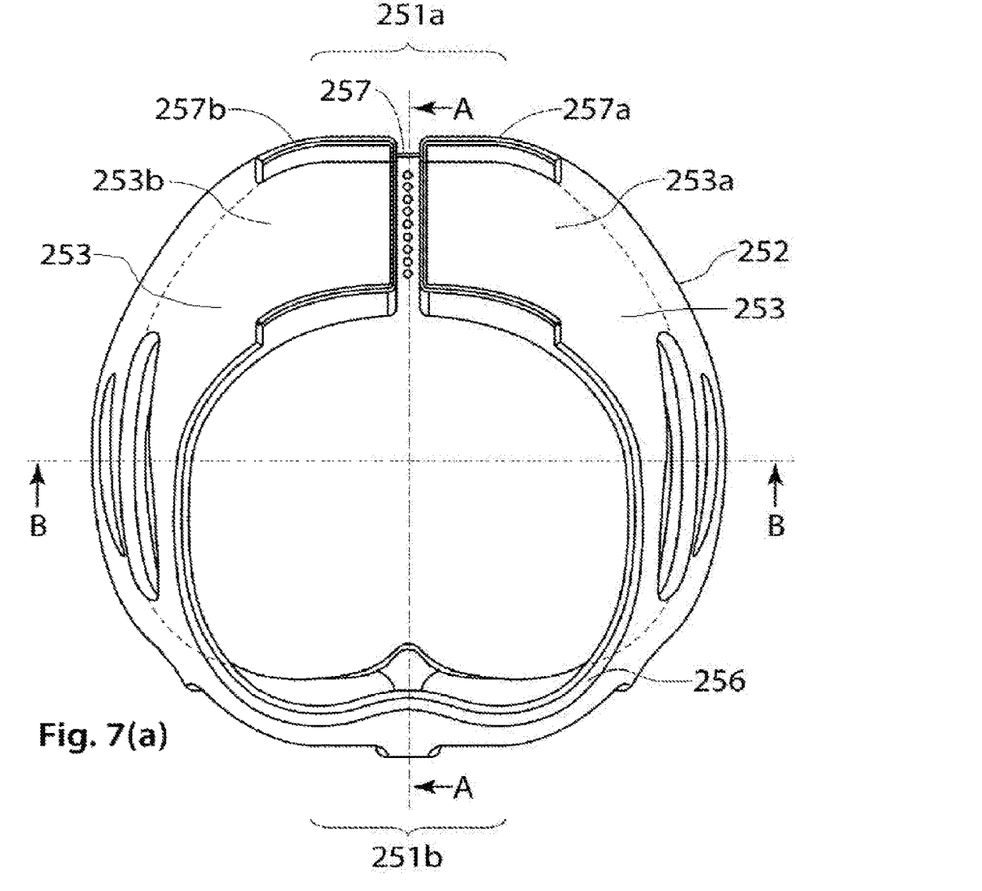
FIG. 7*a* is a top view of the shell of the second embodiment of the boot.
Figure 7B:
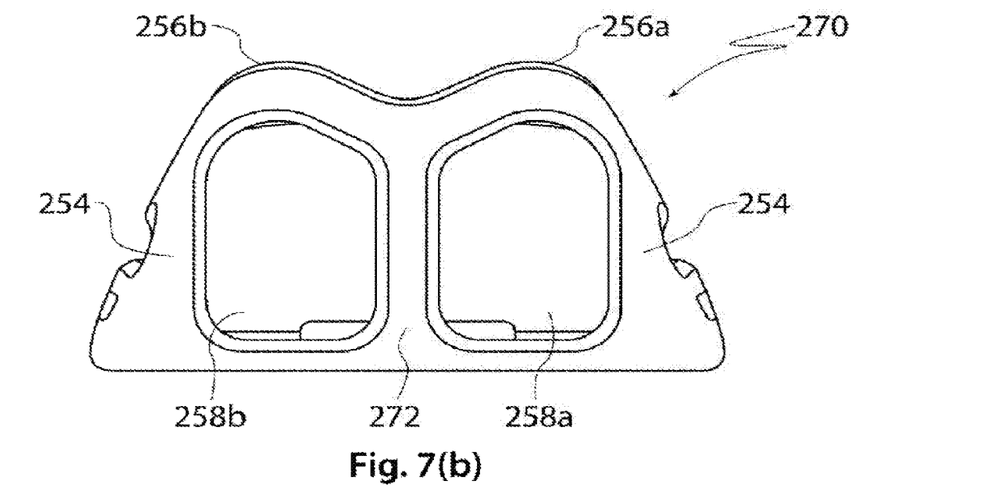
FIG. 7*b* is a rear view of the shell of the second embodiment of the boot.
Figure 7C:
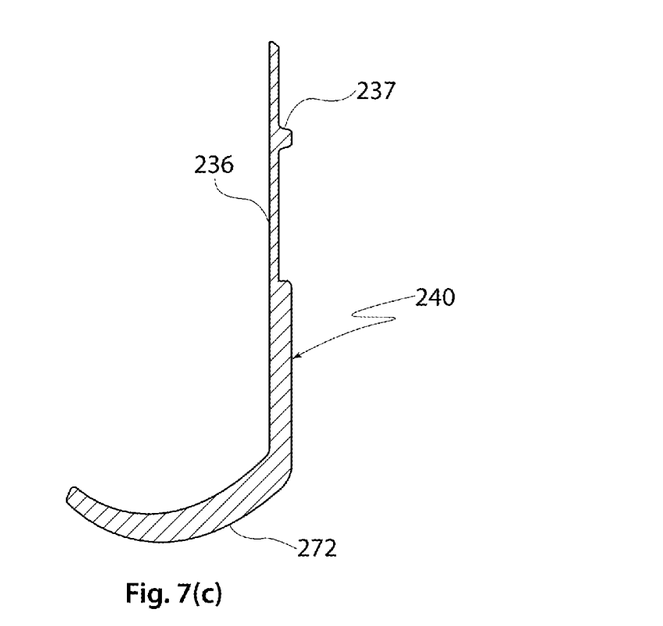
FIG. 7*c* is section A-A through FIG. 7*a*.
Figure 7D:
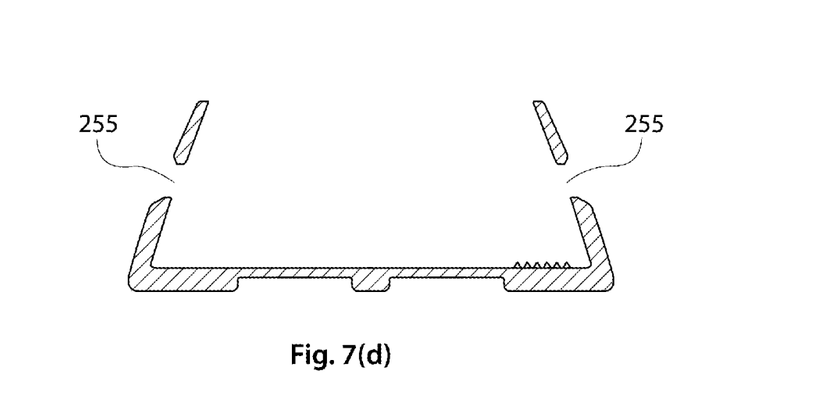
FIG. 7*d* is section B-B through FIG. 7*a*.
Figure 8:
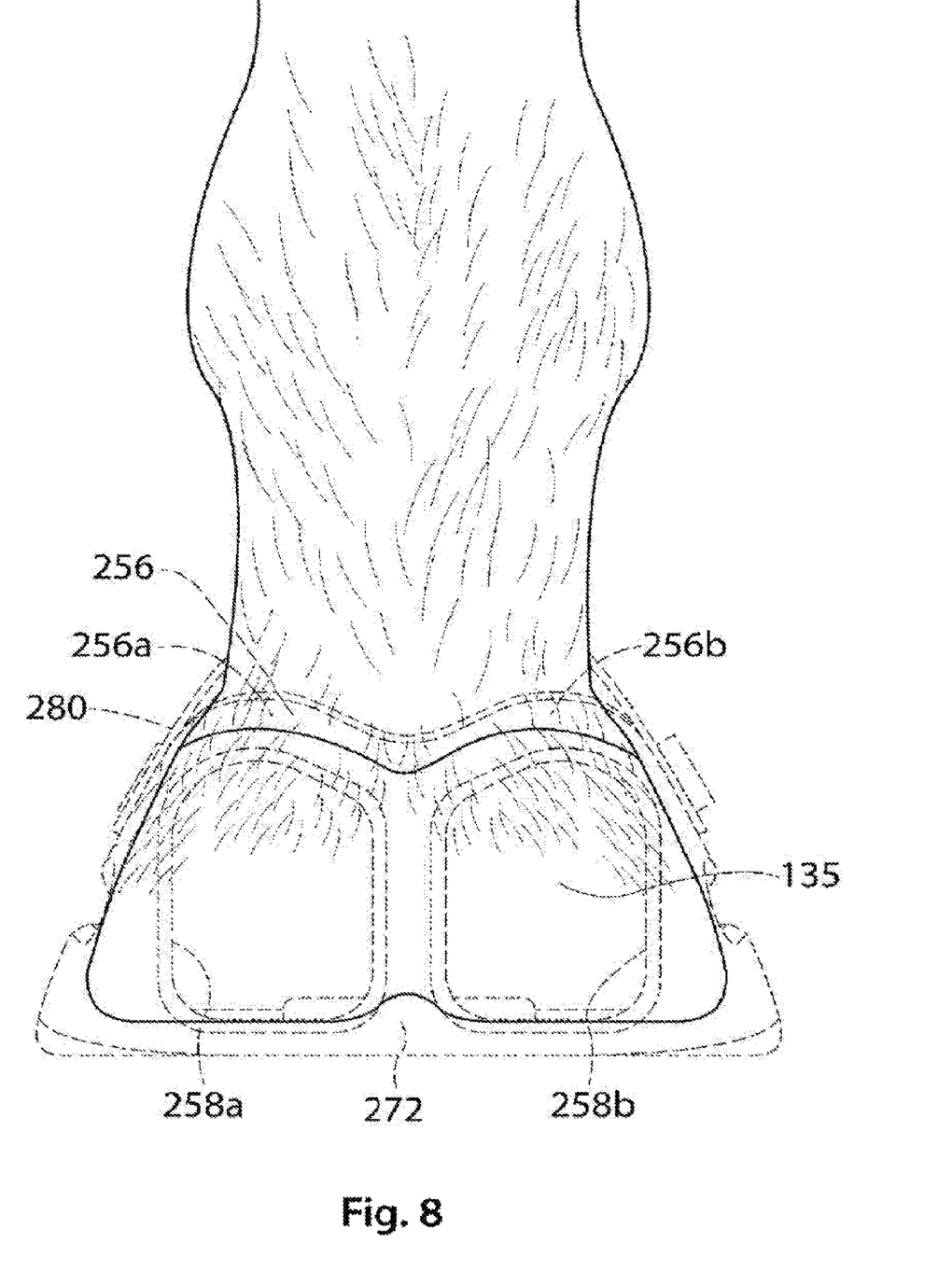
FIG. 8 is a rear view of the second embodiment of the boot showing fitting of the boot in ghost lines with the pastern strap omitted for clarity.

Front opening 257 sits between front flaps 253a and b with lateral slits 257a and 257b above sole member 230. Each strap 260 is riveted at one end to front flap 253b and has appropriate apertures at the other end to allow fastening to knob hooks mounted on front flap 253a adjacent front opening 257. Lugs 259 located above and below straps 260 help protect the straps from wear. Lateral slits 257a and 257b are defined at least in part by the interior upper surface of the sole member and opposite, upwardly-extending first and second side edges 300a and 300b of the lower end of the ventral portion 251a. As shown in FIGS. 5 and 6, the equine boot 210 is open along a periphery of the sole member 230 from the first side edge 300a to the second side edge 300b to expose fully a lower forward central portion of the toe 302 along the lateral slits 257a and 257b when the boot is worn.

Upper edge 256 sits below hairline at the front of hoof 100 as there is no collar in this embodiment. Upper edge 256 of sidewalls 253 is curved upwards into arches 256a and 256b at rear of boot. Security strap 280 is removably attached to arch 256a with a stud at one end and, at the opposite end has appropriate apertures to engage with knob hooks on arch 256b at the rear of boot 210.

Dorsal portion 251b is substantially open due to apertures 258a and 258b. Bulb engaging means 270 is provided by arches 256a and b, rear legs 254 and shank 272 which runs between upper edge 256 and sole member 230.

Apertures 258a and 258b are ovoid in shape and design be seated around the periphery of bulbs 135 when boot 210 is fitted.

Bulb engaging means 270 is essentially 'm' shaped and is particularly suited to engaging the periphery of the bulbs.

The open rear of the boot and the enclosed ventral portion causes the bulbs to be pushed out of the open back of boot 210 and forced into bulb engaging means 270 providing a fit akin to a form fit or a friction fit.

Although in the embodiment illustrated the dorsal portion of the boot is open, it is contemplated that the dorsal portion could be covered by a soft or pliable material such as a mesh or netting (i.e. a material which would not put any effective pressure on the cups of the bulbs) which would still allow the bulbs to be pushed back against the bulb engaging means 270.

While the prior art requires the periphery of the sole member and upper portions of the sole member to conform as closely as possible to the shape of the horse's hoof wall to minimize movement of the hoof within the boot, the present invention provides a more versatile fit. This is because the inventor utilizes the bulbs to provide anchoring.

The rear of boot 10, 210 is an important feature of this invention. The rear of boot 10, 210 has dorsal portion 51b, 251b which is open, or substantially open around heel of hoof 130. The open heel allows bulbs 135 of hoof 100 to be accommodated on the outside of boot 10, 210 rather than inside the boot which is the practice of traditional hoof boots. Bulbs 135 of the hoof 100 are anchored by shank 72, 272. This shape of the rear of the boot moulds to the shape of bulbs 135 and locks the bulbs into this area of the boot which prevents the boot from moving backwards and forwards and from rotating on the hoof. At the same time shank 72 and collar 56 or shank 272 and curved member in the form of upper edge 256 prevent the boot pulling downwards preventing sole member 30, 230 from losing contact with the sole of the hoof. This combination of features locks the bulbs firmly into the rear of the boot, prevents the boot rotating and separating from the sole of the hoof. Specifically the shank lies over the cleft in the dorsal part of the bulbs and this is the feature which prevents the boot moving away from the heels of the hoof. The shank which engages the cleft of the bulbs is combined with an upper which is either a collar or a curved member which lays over the upper dorsal part of the bulbs and extends down the lateral sides of the bulbs. These associated lateral structures are what prevent the boot rotating by "capturing" or gripping the peripheries of the bulbs but do not put any effective pressure on the cups of the bulbs. These functions provide ultimate security not achieved with prior art hoof boots.

Example 1

Construction of the Boot

A person skilled in the art will be familiar with the materials and construction methods employed to make a hoof boot, for example those disclosed in the prior art discussed earlier.

In the second embodiment, shell 252 and sole member 230 of boot 210 is produced by an injection moulding process making it an integral one piece construction. TPU of 60 Shore D hardness by Bayer® is injected into the mould, left for an appropriate time to harden and then removed. Separate straps made of TPU of an appropriate hardness are attached onto shell 252.

It is envisaged that the boot will be made in a number of different sizes to cover the range of most hooves. Boots start at size 4 (135 mm wide by 130 mm long). Hoof size is determined by measuring the front of the toe straight over the middle of the frog down to the buttress of the heel (being the furthest part of the ground bearing area of the hoof).

Further it is envisaged that the boot shell may be produced by laser sintering techniques using suitable TPU or other materials.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

Throughout this specification and the claims that follow, unless the context requires otherwise the words "comprise", "comprises", "comprising" will be understood to mean the inclusion of the stated integer, step or group of integers or steps but not the exclusion of any of other integer, step or group of integers or steps.

The claims defining the invention are as follows:

1. An equine boot comprising:
    a sole member having an interior upper surface for receiving a bottom of a hoof;
    an upper having a ventral portion, an inside of the ventral portion being contactable with a toe of the hoof when the boot is worn;
    at least one strap for securing the boot in a closed condition; and
    a front opening in the equine boot extending through the ventral portion and comprising:
        a lateral slit extending through a lower end of the ventral portion at a level of the interior upper surface of the sole member, wherein the lateral slit is defined at least in part by the interior upper surface of the sole member and opposite, upwardly-extending first and second side edges of the lower end of the ventral portion, the equine boot being open along a periphery of the sole member from the first side edge to the second side edge to expose fully a lower forward central portion of the toe along the lateral slit when the boot is worn, and
        a substantially vertical slit, wherein the substantially vertical slit and the lateral slit together define a t-shaped opening in the ventral portion,
    wherein the boot is movable from an open condition for application of the boot to the hoof and the closed condition where the boot is secured to the hoof by the at least one strap.

2. The boot of claim 1, wherein the ventral portion comprises first and second front flaps located on opposing sides of the front opening, and wherein the boot is movable between:
    the open condition in which the at least one strap is unfastened from at least one of the first and second flaps to allow the boot to be opened to allow application of the hoof into the boot; and
    the closed condition in which the at least one strap is fastened to the first and second flaps to securely contain the hoof in the boot.

3. The boot of claim 2, wherein a first end of the at least one strap is secured to the upper with a first fastener and a second end of the at least one strap is releasably fastenable to the upper with a second fastener, and wherein the lateral slit has a length that is greater than a distance between the first and second fasteners.

4. The boot of claim 1, wherein the front opening extends from an upper edge of the upper and through the ventral portion to the level of the interior upper surface of the sole member so as to allow the ventral portion to be spread open for application of the boot to the hoof.

5. The boot of claim 1, wherein the sole member and the upper are moulded as a unitary piece.

* * * * *